US012585323B2

(12) United States Patent
Zou

(10) Patent No.: US 12,585,323 B2
(45) Date of Patent: *Mar. 24, 2026

(54) POWER SUPPLY DRIVER WITH POWER SAVING CIRCUITRY

(71) Applicant: SEMICONDUCTOR COMPONENTS INDUSTRIES, LLC, Scottsdale, AZ (US)

(72) Inventor: Han Zou, Gilbert, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 97 days.

This patent is subject to a terminal disclaimer.

(21) Appl. No.: 18/613,553

(22) Filed: Mar. 22, 2024

(65) Prior Publication Data

US 2024/0231474 A1     Jul. 11, 2024

Related U.S. Application Data

(63) Continuation of application No. 17/445,518, filed on Aug. 20, 2021, now Pat. No. 11,940,864.

(Continued)

(51) Int. Cl.
*G06F 1/26* (2006.01)
*G06F 1/28* (2006.01)
(Continued)

(52) U.S. Cl.
CPC .............. *G06F 1/3296* (2013.01); *G06F 1/28* (2013.01); *H02M 1/0058* (2021.05); *H02M 1/083* (2013.01); *H02M 3/158* (2013.01)

(58) Field of Classification Search
CPC . G06F 1/3296; G06F 1/28; G06F 1/26; G06F 1/32; H02M 1/0058; H02M 1/083;
(Continued)

(56) References Cited

U.S. PATENT DOCUMENTS 8,971,060 B2 * 3/2015 Wu ................... H02M 3/33523
363/21.13
9,742,302 B2 8/2017 Xue et al.
(Continued)

OTHER PUBLICATIONS

U.S. Appl. No. 17/445,518, filed Aug. 20, 2021, Allowed.
(Continued)

*Primary Examiner* — Xuxing Chen
(74) *Attorney, Agent, or Firm* — Brake Hughes Bellermann LLP

(57) ABSTRACT

A multiphase power supply including a controller and phases can respond to a drop in load level by reducing, changing, or disabling the functions of some circuits within the active phase during these conditions. Estimating these conditions, however, may be difficult for a controller when the communication between the controller and the phase is limited. The disclosure describes an active phase that estimates a state of the load based on a sensed output current and a pulse width modulation control signal. The active phase may change its operating mode to match the estimated state of the load so that lighter load conditions consume less power. Furthermore, the idle phase(s) may nearly turn off all function except PWM detection to save power. Because this mode change is local to the phase, no additional communication with the controller is required.

18 Claims, 6 Drawing Sheets

600

RECEIVING A PWM SIGNAL AT A DRMOS
610

GENERATING AN OUTPUT CURRENT ACCORDING TO THE PWM SIGNAL
620

SENSING A CURRENT IN THE DRMOS THAT CORRESPONDS TO THE OUTPUT CURRENT
630

DETERMINING A LOAD CONDITION FROM THE SENSED CURRENT AND THE PWM SIGNAL
640

ADJUSTING AN OPERATING MODE OF DRMOS ACCORDING TO DETERMINED LOAD CONDTION TO REDUCE A QUIESCENT POWER CONSUMED
650

NEXT PWM CYCLE

Related U.S. Application Data

(60) Provisional application No. 62/706,495, filed on Aug. 20, 2020.

(51) Int. Cl.

| | |
|---|---|
| *G06F 1/32* | (2019.01) |
| *G06F 1/3296* | (2019.01) |
| *H02M 1/00* | (2006.01) |
| *H02M 1/08* | (2006.01) |
| *H02M 3/158* | (2006.01) |

(58) Field of Classification Search
CPC .. H02M 3/158; H02M 1/0009; H02M 1/0032; H02M 1/0048; H02M 3/1584; Y02B 70/10; Y02D 10/00

See application file for complete search history.

(56) References Cited

U.S. PATENT DOCUMENTS

| | | | | |
|---|---|---|---|---|
| 10,277,105 | B1 * | 4/2019 | Vinciarelli | .......... H01L 23/5384 |
| 10,763,738 | B1 | 9/2020 | Dharmalinggam et al. | |
| 10,958,174 | B1 * | 3/2021 | Singh | .................. H02M 3/1582 |
| 2011/0221405 | A1 | 9/2011 | Tang et al. | |
| 2015/0091536 | A1 | 4/2015 | Tanaka | |
| 2016/0043634 | A1 * | 2/2016 | Bemat | ....................... G06F 1/26 713/300 |
| 2016/0322907 | A1 * | 11/2016 | Hwang | ................... H02M 1/36 |
| 2018/0081351 | A1 * | 3/2018 | Tankersley | ............. G05D 1/652 |
| 2022/0004248 | A1 * | 1/2022 | Chen | ................... H02M 1/0058 |

OTHER PUBLICATIONS

ON Semiconductor, "FAN5350 3MHz, 600mA Step-Down DC-DC Converter in Chip-Scale and MLP Packaging," Oct. 2017, Rev. 2.

Texas Instruments, "TPS62770 Multi-Rail DC/DC Converter for Wearable Applications," SLVSCXOB, Feb. 2016, revised Apr. 2016.

Renesas, "RAA212421 3V to 40V Input, 1.1A Synchronous Buck Regulator with Integrated 500mA LDO," FN9309, Rev.3.00, Jul. 8, 2019.

* cited by examiner

1

POWER SUPPLY DRIVER WITH POWER SAVING CIRCUITRY

CROSS-REFERENCE TO RELATED APPLICATION

This continuation application claims priority to U.S. patent application Ser. No. 17/445,518 filed on Aug. 20, 2021, which claims the benefit of U.S. Provisional Application No. 62/706,495, filed on Aug. 20, 2020. These applications are hereby incorporated by reference in their entirety.

FIELD OF THE DISCLOSURE

The present disclosure relates to multiphase switch mode power supplies (SMPS) and more specifically to a phase that is configurable into one of a plurality of operating modes corresponding to a load condition.

BACKGROUND

Computer systems can include a power supply for supplying a voltage/current to a processing core (i.e., core). The power required by the core may fluctuate as processing demands change. The power supply may include a controller that monitors the power requirements of the core and can increase or decrease resources to meet the demand in an efficient way. For example, the power supply may include a plurality of phases that combine at the output to provide power to the core. When the power required by the core is low, some of these phases may be disabled to reduce the power consumed by the power supply. While disabled, the active phase (or phases) may still consume a quiescent power that can reduce an operating time of a battery powered computing system, such as a laptop computer. Accordingly, it may be desirable to reduce this quiescent power.

SUMMARY

In at least one aspect, the present disclosure generally describes a phase of a core supply. The core supply includes a zero-current detector (ZCD) circuit configured to receive a sensed signal corresponding to an output current during a pulse width modulated (PWM) cycle of a PWM signal received at the phase. The ZCD circuit is further configured to compare the sensed signal to a ZCD threshold and to output a ZCD signal based on the comparison. This ZCD signal indicates a presence or absence of a ZCD point in the output current during each PWM cycle. The phase further includes a PWM level detector circuit that is configured to determine a level of the PWM signal during the PWM cycle. The phase further includes a state machine configured to determine a load condition during the PWM cycle based on the level of the PWM signal and the ZCD signal and to adjust an operating mode of the phase according to the determined load condition.

In another aspect, the present disclosure generally describes a method. The method includes reducing a quiescent power consumed by a phase of a core supply by configuring the phase to receive a PWM signal; generate an output current according to the PWM signal; sense the output current; determine a load condition form the sensed output current and the PWM signal; and select an operating mode from a plurality of possible operating modes based on the determined load condition.

In another aspect, the present disclosure generally describes a power system that includes a processing core, a controller, and a plurality of phases. The plurality of phases are controlled by the controller to supply power to the processing core according to a load condition of the processing core. The plurality of phases are configured to transmit a temperature monitor signal and a current monitor signal to the controller and receive a PWM signal and an enable signal from the controller. Each phase enabled by the enable signal is configured to generate an output current according to the PWM signal. Each enabled phase is further configured to sense the output current and detect the presence or absence of a ZCD point in the sensed output current during each PWM cycle of the PWM signal. Each enabled phase is further configured to estimate a first load condition, a second load condition, or a third load condition based on a state machine that relates the load condition to the presence or absence of the ZCD point and the timeout period. Each enabled phase is further configured to operate in the ON mode in the first load condition, in a low-power mode in the second load condition, or in an idle mode in the third load condition.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

The present disclosure describes systems and methods for reducing a quiescent power consumed by an active phase of a multiphase power supply (i.e., core supply) so that the phase can meet the power requirements of the load efficiently. The disclosed phase includes circuitry to sense a current corresponding to the output current and to determine a load condition (i.e., load state) of the load based on the sensed current and a pulse width modulation (PWM) control signal. Upon determining the load condition, the phase may change its operating mode to limit or disable circuits in order to reduce the quiescent power consumed. By controlling the operating mode at the phase, no additional communication for this purpose is needed between the phase and the controller. Additionally, a finer control over the reduction of the quiescent power may be achieved because control at the phase allows for a mode of operation to be changed mid cycle. In particular, the phase can operate in the idle mode during inactive portions (i.e., dead portions) of cycles of the PWM signal to save power.

The disclosed core supply includes an active power-saving feature that adapts phase operation to a variety of load conditions with circuitry and components that are simpler, smaller, and less expensive than other approaches. This active power-saving feature may have the technical effect of extending a processing time of a battery powered computing device (e.g., laptop computer). Further, this active power-saving feature may be incorporated into existing power system designs without requiring significant changes.

Figure 1:
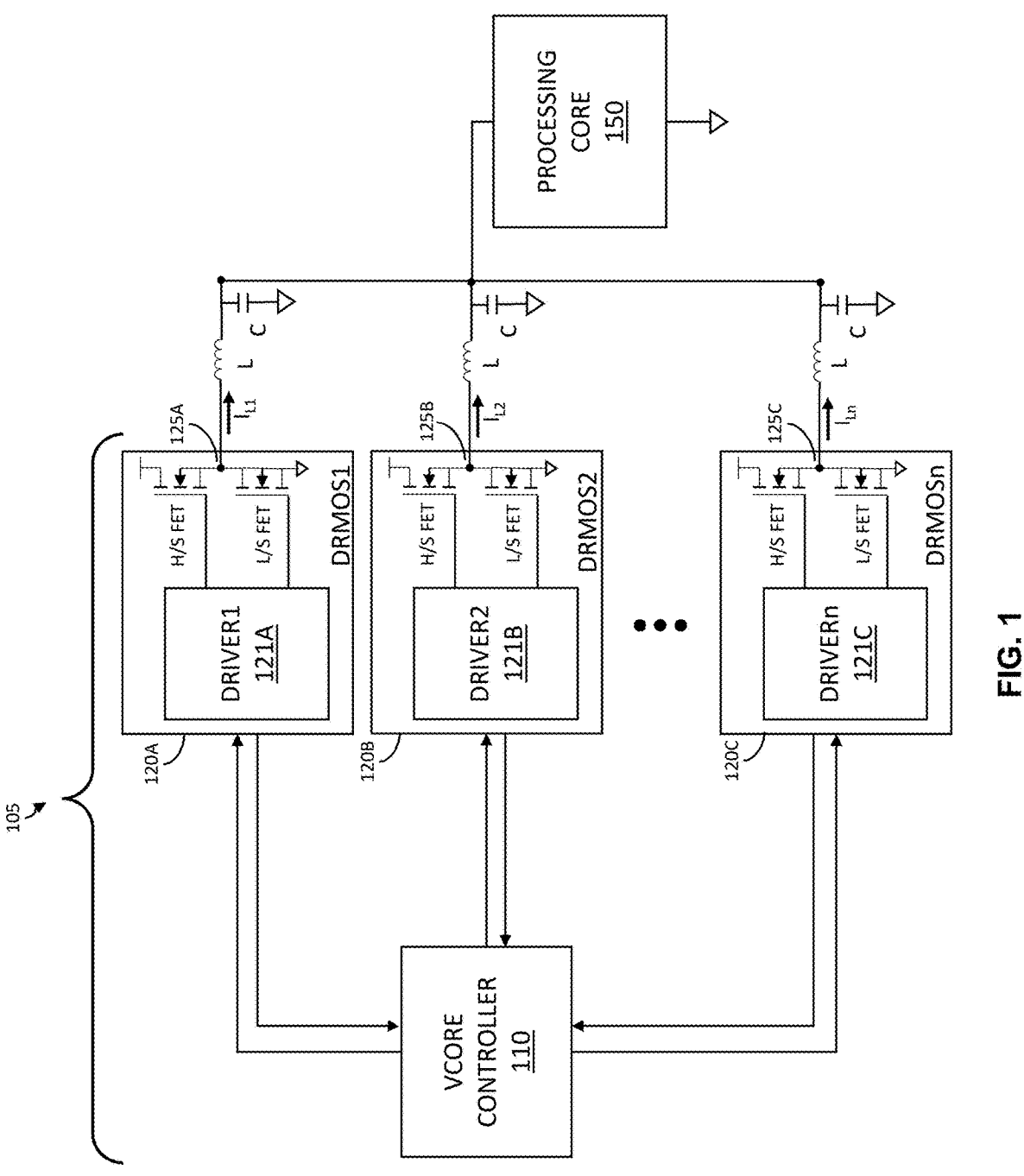
FIG. 1 schematically depicts a power system according to a possible implementation of the present disclosure.

FIG. 1 illustrates a block diagram of a power system (i.e., Vcore system) according to a possible implementation of the present disclosure. The Vcore system 100 includes a core supply 105 configured to provide power (i.e., voltage, current) to a processing core 150. The core supply 105 includes a Vcore controller 110 in communication with multiple phases 120A, 120B, 120C. Each phase of the multiple phases may include a driver 121A, 121B, 121C. Based on signals received from the Vcore controller (i.e., controller), each driver can control a high-side metal-oxide-semiconductor field-effect transistor (i.e., H/S FET) and a low-side metal-oxide-semiconductor field-effect transistor (i.e., L/S FET) to couple a switching node 125A, 125B, 125C (i.e., output node) alternatively to a supply voltage and a ground voltage. For example, the Vcore controller 110 may output a pulse width modulated (PWM) signal that in a first state (e.g., HIGH state) causes the driver to turn ON the H/S FET and turn OFF the L/S FET (e.g., during a first portion of a PWM cycle), and in a second state (e.g., LOW state) causes the driver to turn OFF the H/S FET and turn ON the L/S FET (e.g., during a second portion of the PWM cycle). The controller and the multiple phases can be discrete components.

In some implementations, the driver, the H/S FET, and the L/S FET can be combined within a device known as a driver-MOS (i.e., DRMOS). In other words, the DRMOS is a phase that includes drivers and power transistors in the same package. The disclosure will describe implementations using a DRMOS for each phase. Accordingly, the terms DRMOS and phase may be used interchangeably in this disclosure. The scope of the disclosure is not limited to a DRMOS implementation, however, because the driver, H/S FET, and L/S FET can be discrete components in some possible implementations.

The switching node 125A, 125B, 125C of each phase (i.e., each DRMOS) may be coupled to an inductor-capacitor filter (i.e., LC filter) to form a synchronous buck converter configured to generate a regulated DC voltage at the output of the LC filter. Each phase may have an LC filter, and the outputs of the LC filters may be combined to produce a regulated voltage at the processing core 150 that has a current that is the sum of the currents supplied by the multiple phases 120A, 120B, 120C.

The Vcore system 100 may be part of a battery-powered computing system and may consume power from a battery (not shown). Accordingly, it may be important for the core supply 105 to consume as little of the battery power as possible while still meeting the load requirements of the processing core 150. The power consumption of the core supply 105 may be characterized as one of a plurality of possible power states based on the current drawn by the processing core 150, as shown in the TABLE 1 below. While the example load currents listed can help in understanding possible ranges and values, they are not intended to be limiting to the present disclosure.

TABLE 1

| EXAMPLE POWER STATES OF A PROCESSING CORE | | | |
|---|---|---|---|
| POWER STATE | LOAD CURRENT | LOAD CONDITION | PHASES |
| PS0 | $I_{CORE} > 25A$ | HEAVY | ALL |
| PS1 | $5A < I_{CORE} < 25A$ | NORMAL | SOME |
| PS2 | $1A < I_{CORE} < 5A$ | NORMAL/LIGHT | ONE |
| PS3 | $I_{CORE} < 1A$ | LIGHT | ONE |
| PS4 | $I_{CORE} \approx 0$ | ULTRA-LIGHT | ONE |

According to the example described by TABLE 1, when the processing core is in a heavy load condition (i.e., PS0) all phases may provide current to the processing core. In other load conditions (e.g., PS2, PS3, PS4) some of the phases may be disabled (i.e., turned-off, made idle) to save power. For example, in a light load condition, a single phase may be all that is required to provide sufficient power (e.g., current) for the processing core to operate. The core supply may be said to be operating in a power-saving mode when only one of the multiple phases is actively providing power to the processing core.

Figure 2:
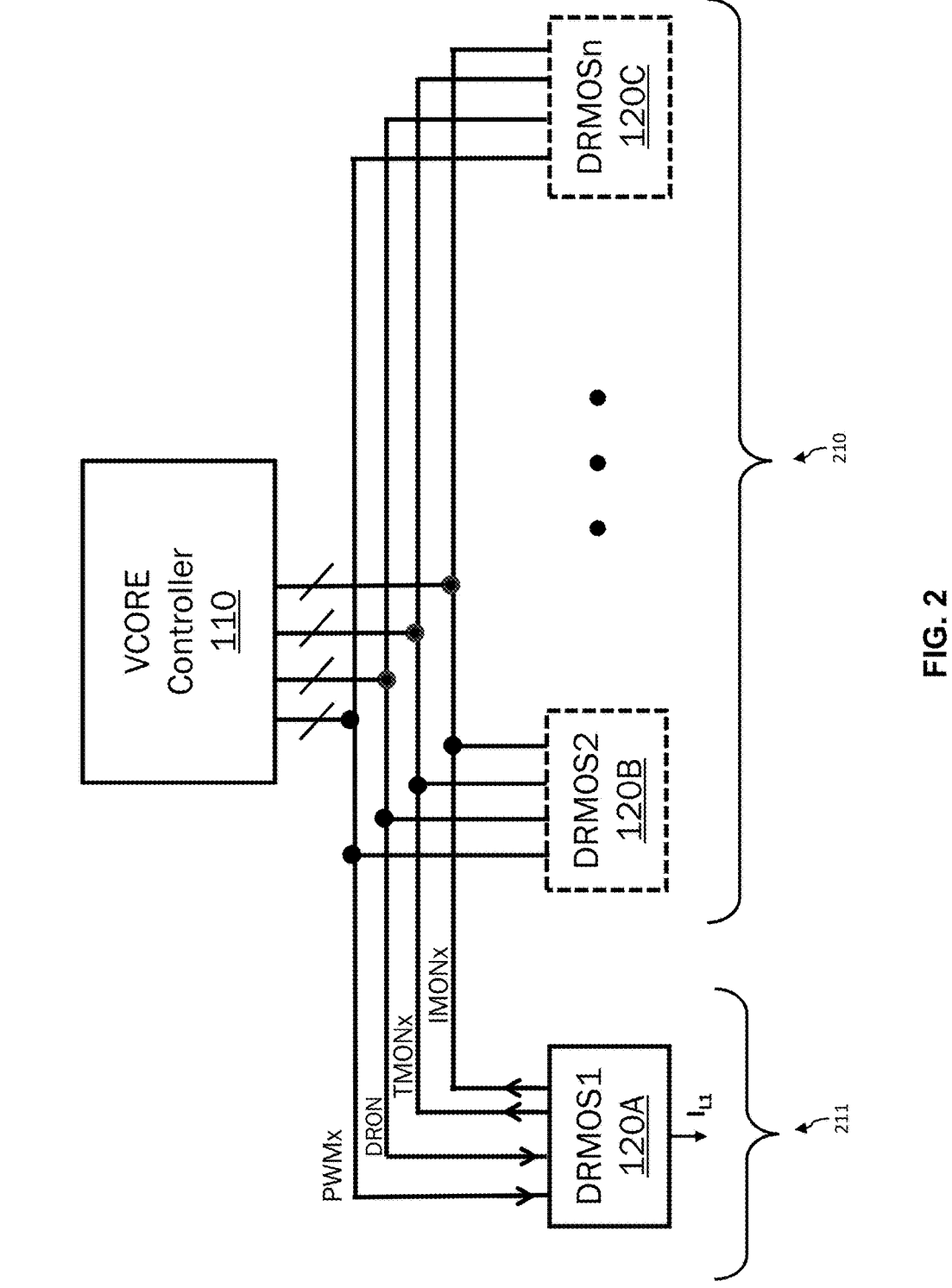
FIG. 2 schematically depicts a core supply according to a possible implementation of the present disclosure.

FIG. 2 illustrates a core supply 105 in a power-saving mode according to an implementation of the present disclosure. In the power-saving mode, one phase may be configured as an active phase 211 (i.e., enabled), while the other phases may be configured as idle phases 210 (i.e., disabled). The Vcore controller 110 may control this configuration based on a determination of a load condition (e.g., HEAVY, NORMAL, etc.). This determination can be straightforward when the Vcore controller 110 has access to the phases 120A, 120B, 120C (i.e., is in the same package). For the implementation shown in FIG. 2, however, communication between the Vcore controller 110 and the phases 120A, 120B, 120C is limited.

As shown in FIG. 2, the Vcore controller 110 and the multiple phases may communicate multiple signals. A first signal of the multiple signals is an enable signal (DRON) that is transmitted from the Vcore controller 110 to each phase. The DRON signal may be a binary signal that can enable/disable each phase based on its level. For example, a HIGH DRON signal can place the DRMOS in an enabled mode (i.e., ENABLE) in which the DRMOS can operate according to one of multiple operating modes (e.g., ON_MODE, LP_MODE, IDLE_MODE).

A second signal of the multiple signals can be a pulse width modulation signal (PWMx) that is transmitted from the Vcore controller 110 to each phase (e.g., $PWM_1$ is received by DRMOS1). The PWMx can be interpreted by the driver for control of an L/S FET ON/OFF condition and an H/S FET ON/OFF condition for each cycle of the PWM signal.

A third signal of the multiple signals can be a sensed temperature signal (TMONx) that is transmitted from the phases to the Vcore controller 110. For example, the sensed temperature signals from the phases can be tied to a single input at the Vcore controller, with the highest sensed temperature signal of the phases becoming the input. Fr example, the TMONx signal corresponds to TMON1 when TMON1 is the highest sensed temperature of the phases.

A fourth signal of the multiple signals can be a sensed current signal (IMONx) that is transmitted from each phase to the Vcore controller 110 (e.g., IMON1 is transmitted by DRMOS1). The IMONx signals correspond to the output currents (i.e., inductor currents) of the phases (i.e., $I_{L1}$, $I_{L2}$, . . . $I_{Ln}$). For the situation in which a single phase is described (e.g., a single active phase) the output current may be simply referred to as $I_L$.

In some load conditions (e.g., LIGHT), the active phase 211 may be operated in a discontinuous current mode (DCM). In DCM, an output current at the switching node (i.e., $I_L$) is depleted before the end of a PWM cycle. Further, it may be possible for the inductor current (i.e., $I_L$) to become negative and reverse back into the switching node which can be inefficient because the L/S FET of the DRMOS (i.e., DRMOS1) may conduct this current to ground. Accordingly, in some implementations the PWM signal may have a third state (i.e., MID state) that exists in DCM operation (i.e., in light load conditions). The third state may enable control of the L/S FET by a zero current detect (ZCD) signal, which indicates this situation. The ZCD signal can provide an added functionality that turns the L/S FET OFF while the H/S FET is OFF to prevent the inductor current from becoming negative.

This added functionality for efficiency, may require added circuitry in the DRMOS. For example, a DRMOS may include a zero-current detection (ZCD) circuit configured to generate a ZCD signal when the inductor current reaches zero during a PWM cycle. For example, a voltage or a current corresponding to the output current may be sensed/ monitored (e.g., after a delay) when the L/S FET is ON, as the output current falls towards zero. The sensed signal may be compared to a ZCD threshold to determine a presence or absence of a ZCD point. For example, when the output current reaches the ZCD threshold (e.g., zero), the ZCD signal can turn the L/S FET OFF. In this condition, positive current can still flow through a body diode of the L/S FET, but the body diode will block current in a negative direction. This added circuitry may cause drivers to consume a quiescent power. This quiescent power can be consumed even when the L/S FET and the H/S FET are both OFF.

Figure 3:
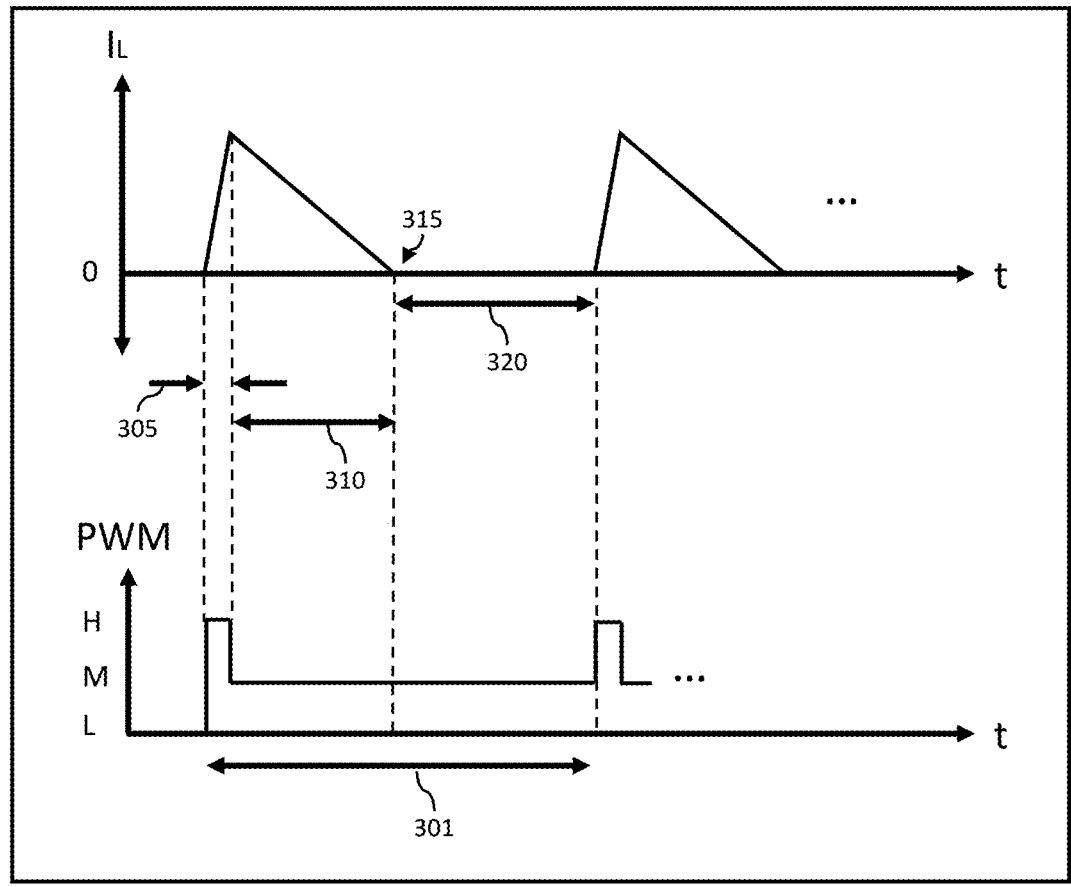
FIG. 3 illustrates graphs of portions of a PWM signal and a corresponding output current of a core supply according to a possible implementation of the present disclosure.

FIG. 3 illustrates time-based graphs of a PWM signal (PWM) and an output current ($I_L$) for an active phase (DRMOS) of a core supply. As shown, the PWM signal (PWM) may change levels at different times during a PWM cycle 301. The levels and timing of the PWM signal trigger the driver to control the H/S FET and the L/S FET accordingly so that an output voltage may be regulated to a particular level. Accordingly, the levels and the timing of the PWM signal may change from PWM cycle-to-cycle.

In a first portion 305 of the PWM cycle 301 (i.e., charging portion), the PWM signal is at a high (H) level (e.g., 5V). This level can cause the driver to turn the H/S FET ON and the L/S FET OFF so that the output current ($I_L$) increases.

In a second portion 310 of the PWM cycle 301 (i.e., discharging portion), the PWM signal is at a middle (M) level (e.g., 2.5V). This level causes the driver to turn the H/S FET OFF and the L/S FET ON so that the inductor current ($I_L$) decreases. Additionally, the middle level (M) of the PWM signal can correspond to DCM operation, and can configure the driver to place the H/S FET and the L/S FET into an OFF state based on outputs of based on a ZCD time (i.e., ZCD point 315) at which the output current ($I_L$) is reduced to zero.

In a third portion 320 of the PWM cycle 301, a ZCD detector circuit may generate a ZCD signal based on the inductor current reaching zero. The ZCD signal may cause the driver to turn the L/S FET OFF (i.e., while the H/S FET is OFF). Accordingly, in the third portion 320, the phase is idle (OFF) until the end of the PWM cycle 301. As a result, the third portion 320 may be referred to as the idle period, or dead period, of the PWM cycle 301. Circuitry within the driver, such as the ZCD circuit, may continue to consume a quiescent power during the idle period, which is inefficient. Accordingly, the present disclosure describes circuitry that can shut down when an idle period continues for a period longer than a timeout.

The power consumed by a driver of an active phase 211 of a core supply 105 during a PWM cycle 301 may be referred to as the quiescent power consumption. The quiescent power consumption may be small but significant in some circumstances. The present disclosure describes techniques to reduce the quiescent power in these circumstances. For example, during the idle period, certain functions of the driver are not required, are only partially required, or are required at a reduced precision and therefore may be adjusted (e.g., reduced, curtailed, and/or paused) to save power. The present disclosure describes circuits and methods to adjust the functions of the driver in response to a load condition indicated by the PWM signal and/or the output current signal.

When a particular load condition occurs over multiple PWM cycles, then the core supply may be configured to deduce a particular load condition and respond by placing the core supply into a corresponding operating mode. The present disclosure describes phases (DRMOSs) for a core supply that can be configured to operate according to different load conditions (i.e., states). In other words, the disclosed systems and methods can control operation (e.g., downscale or turn-off) based on a load condition rather than simply based on an output current measurement. This added control may provide more power conservation than simply DCM operation. The disclosed systems and methods can reduce power consumption while the DC-DC converter is in DCM by making a phase idle. The disclosed approach is sensitive enough to reactivate an idle phase quickly in response to a load condition change but is not so sensitive that it switches back-and-forth (i.e., chatters) between operating modes unnecessarily.

Figure 4:
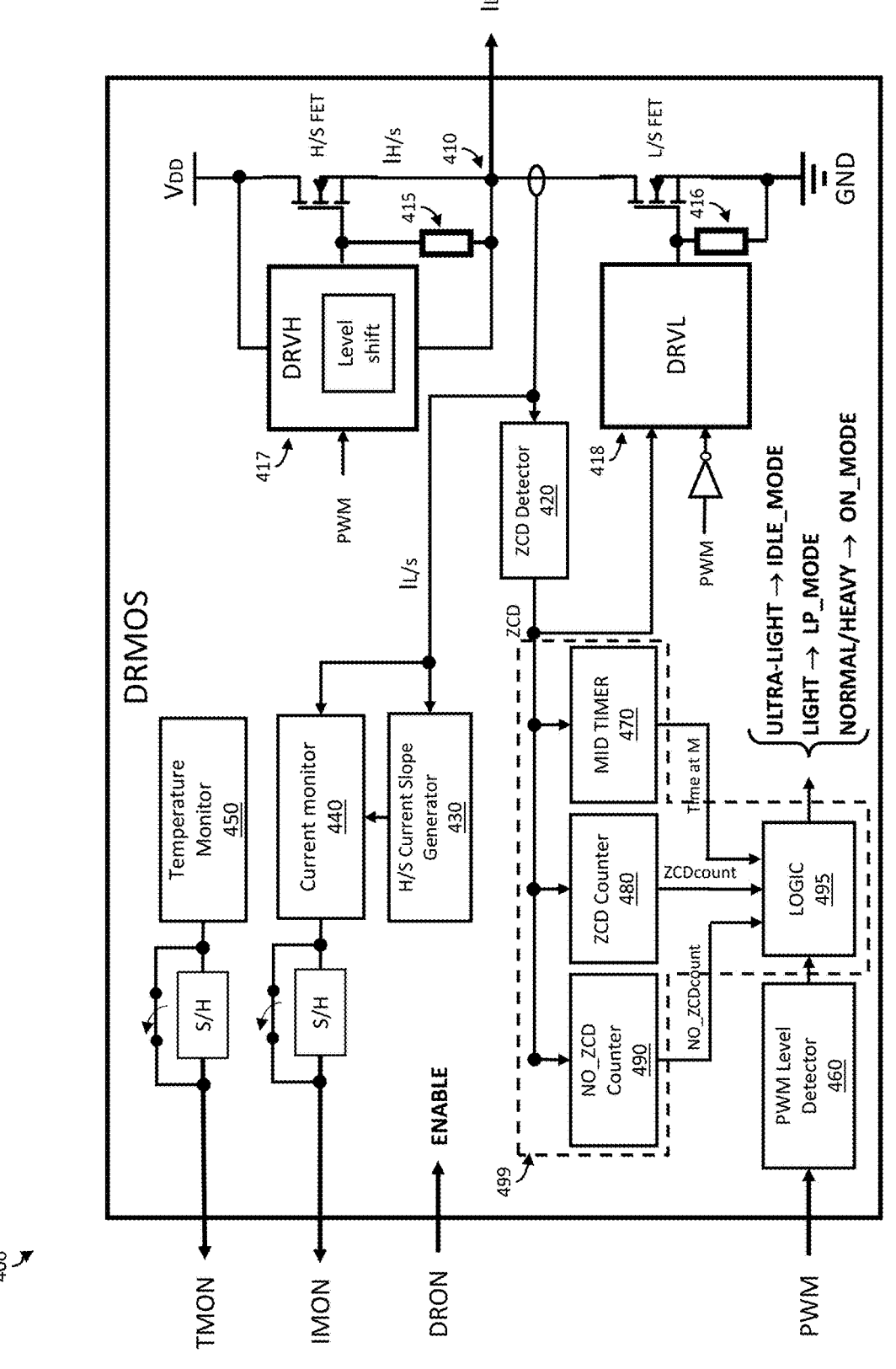
FIG. 4 schematically depicts a phase (DRMOS) of a core supply according to a possible implementation of the present disclosure.

FIG. 4 illustrates a block diagram of a phase of a Vcore system according to a possible implementation of the present disclosure. As shown, the phase is a DRMOS 400 that includes drivers (DRVH, DRVL) and switches (H/S FET, L/S FET) in the same package, though in some implementations they can be separated.

As shown in FIG. 4, the DRMOS 400 includes a high-side switch (H/S FET) controlled by a high-side driver (DRVH). The high-side driver may configure the H/S FET ON/OFF according to a PWM signal (PWM). The DRMOS 400 further includes a low-side switch (L/S FET) controlled by a low-side driver (DRVL). The low-side driver may configure the L/S FET ON/OFF according to an inverted PWM signal or, as described previously, according to a ZCD signal (ZCD), which indicates when the inductor current reaches zero during a PWM cycle.

In light load conditions (e.g., DCM operation), the PWM signal may cycle between a mid-level (M) and a high-level (H). In normal/heavy load conditions (e.g., continuous current mode (CCM) operation), the PWM signal may cycle between a low-level (L) and a high level (H). When the PWM signal is at a mid-level the L/S FET may be controlled by the level (i.e., high or low) of a ZCD signal (ZCD). Some possible switching states of the DRMOS 400 are detailed in TABLE 2. This enables the L/S FET to be ON while an inductor (L) is discharged (i.e., during a second portion 310) and then turned OFF after the inductor has been discharged (i.e., during a third portion 320).

TABLE 2

EXAMPLE SWITCHING STATES OF DRMOS

| PWM | H/S FET | L/S FET |
|-----|---------|---------|
| H | ON | OFF |
| M | OFF | ZCD (ON/OFF) |
| L | OFF | ON |

The DRMOS 400 shown in FIG. 4 includes a ZCD detector circuit (i.e., ZCD circuit 420). The ZCD circuit 420 is configured to monitor a sensed L/S FET current/voltage in order to determine when, or if, the inductor current ($I_L$) (i.e., output current) reaches zero during a PWM cycle. For example, the ZCD circuit 420 may generate a ZCD signal (ZCD) based on a sensed low-side current signal ($I_{L/S}$) corresponding to a current flowing through the L/S FET. For example, the ZCD signal may change states (e.g., step, pulse, etc.) when the sensed low-side current signal ($I_{L/S}$) reaches a threshold (e.g., zero). The change of the ZCD signal may cause the low-side driver to change a state of the L/S FET (e.g., ON/OFF). For example, when PWM is at a mid-level (M) and $I_{L/S}$ is zero, ZCD may cause the low-side driver (DRVL) to turn L/S FET OFF. In some implementations, the DRMOS 400 may include a delay circuit between the ZCD circuit 420 and the low-side driver (DRVL) to delay turning OFF the L/S FET for a delay period after the inductor current ($I_L$) reaches zero.

As shown in FIG. 4, the sensed low-side current signal (Is) at the switching node 410 may also be used by other circuitry of the DRMOS 400 for transmitting information to the controller. As discussed previously, the information transmitted from (i.e., reported by) the DRMOS may include a monitored temperature level (TMON) and a monitored current level (IMON).

The DRMOS 400 includes a current monitor circuit (i.e., current monitor 440) that is configured to generate the monitored current (IMON) based on the sensed low-side current ($I_{L/S}$). While a low-side current may be directly sensed, the monitored current (IMON) may also include a high-side current ($I_{H/S}$) component that is estimated. Accordingly, the current monitor 440 may include a high-side current slope generator circuit (i.e., H/S current slope generator 430) configured to determine a slope of a high-side current ($I_{H/S}$) that can be used by the current monitor 440 to generate a monitored current that includes a high-side (i.e., charging) component and a low-side (i.e., discharging) component.

The DRMOS 400 includes a temperature monitor circuit (i.e., temperature monitor 450) that is configured to determine a monitored temperature (TMON) and in some implementations generate a fault signal based when TMON falls outside an acceptable range.

The drivers (i.e., DRVH, DRVL) and the other circuitry (i.e., H/S current slope generator 430, current monitor 440, temperature monitor 450) contribute to the quiescent power consumption of the device. The function of each of these circuits may be reduced, changed, or stopped in certain load conditions to save power. Accordingly, the present disclosure describes a DRMOS 400 that can be configured into one of a plurality of operating modes in which power consumption and functionality are traded. The choice which operating mode to operate may be based on a load condition. For example, a load condition may be heavy, normal, light, or ultra-light (e.g., see TABLE 1).

The disclosed DRMOS is configured to determine the load condition based on the sensed inductor current ($I_{L/S}$) on a cycle-by-cycle basis. In other words, the load condition may be determined locally by the DRMOS without the need for external communication (e.g., with the Vcore controller). The determined load condition may place the DRMOS into one of a plurality of operating modes. The plurality of operating modes may include (i) an ON mode (i.e., ON_MODE) in which all circuits are fully functional, (ii) a low-power mode (i.e., LP_MODE) the function of some, or all, of the circuits is changed (e.g., reduced), and (iii) an idle mode (i.e., IDLE_MODE) in which function of some, or all, of the circuits is disabled.

As discussed previously, the DRMOS 400 is configured to receive information from the Vcore controller 110. The received information may include a driver-ON signal (DRON). The driver-ON signal may enable the DRMOS for operation or may disable the DRMOS. In other words, a first level (e.g., LOW (L)) of the DRON signal may correspond to the DRMOS in a disabled state (i.e., DISABLE) while a second level (e.g., HIGH (H)) of the DRON signal may correspond to the DRMOS in an enabled state (i.e., ENABLE). While in the ENABLE state the DRMOS may be operated in any of the plurality of operating modes described above.

The received information may further include the PWM signal (PWM). The DRMOS 400 may include a PWM level detection circuit (i.e., PWM level detector 460) that is configured to determine a level of the PWM signal. For example, the PWM level detector circuit may receive a PWM signal from the Vcore controller 110 and output a signal corresponding to a high level (H), a mid-level (M) or a low level (L). The PWM level detector 460 can be configured to remain active and fully functional while the DRMOS is in an idle mode so that, after entering into an idle state, full function of the DRMOS can be restored within a few PWM cycles. A level of the PWM signal may also help determine an operating mode from the plurality of modes described above.

As mentioned previously, the enabled DRMOS may be configured to operate in one of a plurality of modes based on a determined load condition. The load condition may be determined based on the ZCD signal (ZCD) and the level of the PWM signal (PWM). For example, if the PWM signal remains at a mid-level (M) for a period after the inductor current reaches zero (i.e., reaches a ZCD point), the DRMOS may be placed in the IDLE_MODE. Accordingly, the DRMOS 400 may include a timer (i.e., mid-timer 470) configured to start timing at the ZCD time (i.e., ZCD point) and to output a logical signal a timeout period (i.e., timeout) after the ZCD time. For example, the timer may transmit a trigger signal when the PWM signal is at a mid-level for a time greater than or equal to the timeout period. To execute the decision process, the DRMOS 400 may further include logic 495 configured to determine an IDLE_MODE based on the output of the mid-timer 470 and the level of the PWM.

As mentioned, the selection of operating mode may be made on a cycle-by-cycle basis. To avoid switching between too often (i.e., to prevent mode chatter), DRMOS 400 may include counters and logic 495 that set mode-switching conditions. For example, the DRMOS can include a ZCD counter circuit (i.e., ZCD counter 480) configured to count a number of consecutive PWM cycles that have an inductor current that reaches zero. In other words, ZCD counter 480 may be configured to output a running count of the number of consecutive PWM cycles having ZCD points. The DRMOS can further include a missing ZCD counter circuit (i.e., NO_ZCD counter 490) configured to count a number of consecutive PWM cycles that do not have an inductor current that reaches zero. In other words, NO_ZCD counter 490 may be configured to output a running count of the number of consecutive PWM cycles that do not have ZCD points. In a possible implementation, the logic 495 may be configured to switch between the LP_MODE and the ON_MODE based on the outputs of the ZCD counter 480 and the NO_ZCD counter 490.

The logic 495 may output signals corresponding to the IDLE_MODE, the LP_MODE, and the ON MODE. These may be signals for the DRMOS chip that enable/disable or otherwise trigger global changes in the DRMOS operation. For example, an LP_MODE signal may be applied to various circuits in the DRMOS to activate their low power operating mode.

Figure 5:
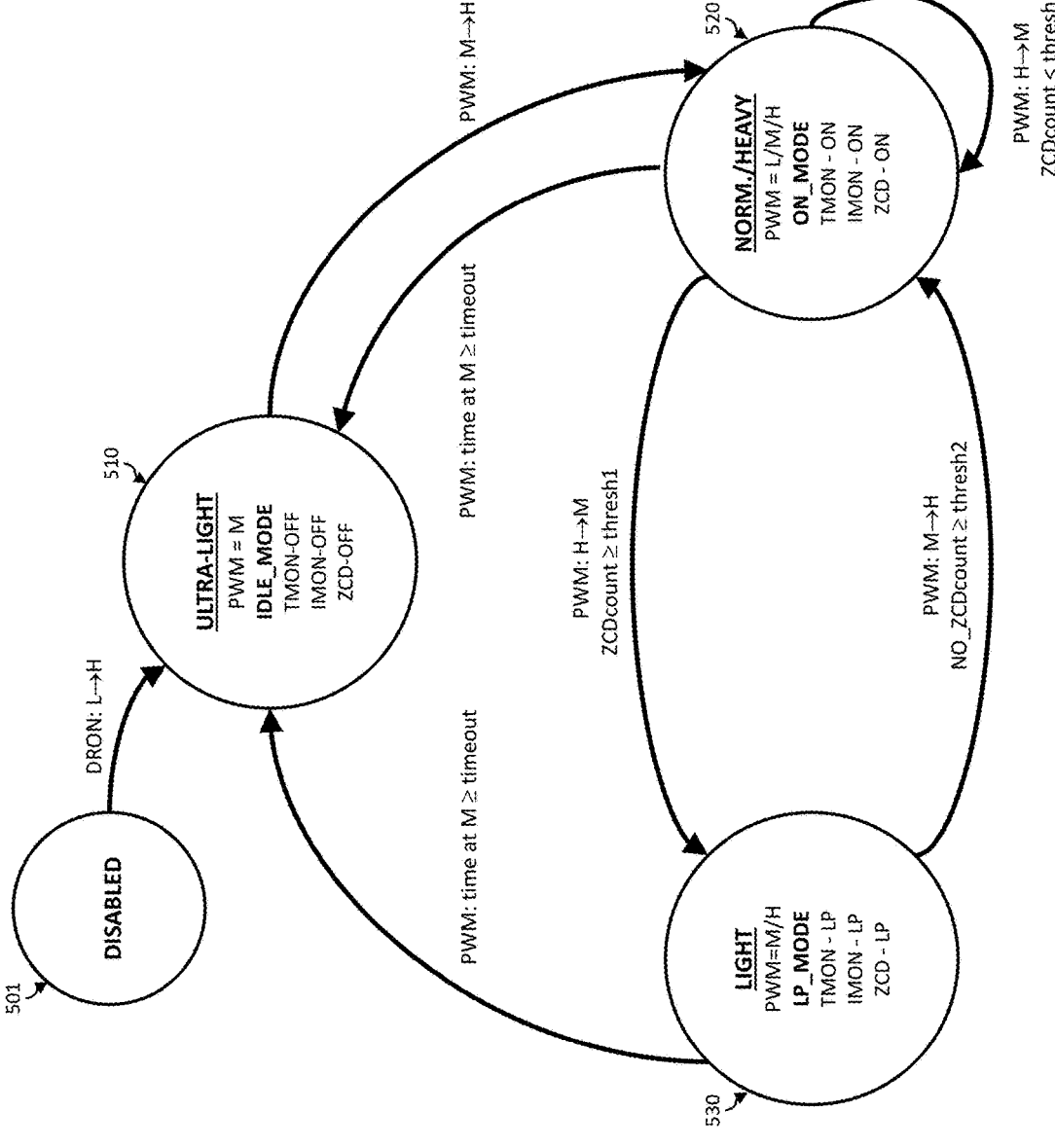
FIG. 5 is a state machine for the determination of a load condition and its corresponding operating mode according to a possible implementation of the present disclosure.

FIG. 5 illustrates a state machine of a DRMOS according to an implementation of the present disclosure. The state machine 500 includes a disabled-state 501 (i.e., DIS-ABLED) in which the DRMOS is inactive. The disabled-state 501 may be changed based on a level of the driver-ON signal (DRON). For example, when DRON is transitioned from a low level (i.e., L) to a high level (i.e., H), the DRMOS 400 may be configured to operate in one of three operating states. Each of the three operating states can be based on a load condition. The three load conditions can include (i) a normal or heavy load (i.e., a first load condition), (ii) a light load (i.e., a second load condition), and (iii) an ultra-light load (i.e., a third load condition). When enabled, the DRMOS can enter the ultra-light load 510 (i.e., ultra-light state) corresponding to an ultra-light load.

In the ultra-light load 510, the DRMOS 400 is configured in an idle mode (IDLE_MODE). In the idle mode, all of the circuits except the PWM level detector 460 can be made non-functional (i.e., turned OFF) to save power. For example, the temperature monitor 450 (TMON), the current monitor 440 (IMON), the H/S current slope generator 430, the ZCD circuit 420 (ZCD), the high-side driver 417, and the low-side driver 418 are made non-functional (i.e., turned OFF) to save power. Additionally, the H/S FET and the L/S FET are in an OFF condition. The OFF condition of the transistors can be maintained by a first resistor 415 and a second resistor 416 when the high-side driver 417 and the low-side driver 418 are turned OFF. In the ultra-light load 510, the DRMOS has the lowest quiescent power consumption of the multiple modes but has no sensing capabilities.

As discussed, at the beginning of each PWM cycle, the PWM signal (PWM) transitions to the high-level (H). In the IDLE_MODE the PWM level detector 460 and the logic 495 can detect when the PWM signal transitions from the mid-level to the high level (i.e., M→H) and output a signal (ON_MODE) that transitions load condition from the ultra-light load 510 to the normal/heavy load 520 (i.e., normal/heavy state).

In the normal/heavy load 520, the DRMOS 400 is configured to operate in an ON mode (ON_MODE), in which all of the circuits are made fully functional (i.e., turned ON). For example, the temperature monitor 450 (TMON), the current monitor 440 (IMON), the H/S current slope genera-tor 430, the ZCD circuit 420 (ZCD), the high-side driver 417, and the low-side driver 418 are made fully functional (i.e., turned ON). In the normal/heavy load 520, the drivers can switch the H/S FET and the L/S FET ON/OFF and can report accurate current and temperature conditions to the Vcore controller. In other words, the ON condition (i.e., in the normal/heavy load 520), the DRMOS has the most versatile operation and most accurate sensing of the multiple modes but has the highest quiescent power consumption.

In the normal/heavy load 520, the PWM signal can be any level (L, M, H). For example, in CCM, the PWM signal may alternate between H (i.e., increasing $I_L$) and L (i.e., decreas-ing $I_L$). As the load level drops, the core supply 105 may operate in DCM. In DCM, a ZCD point 315, wherein $I_L$ equals zero, exists in the PWM cycle 301. A PWM cycle 301 including ZCD point 315 can be referred to as a ZCD cycle.

The DRMOS includes a ZCD counter 480 configured to generate a running total (i.e., ZCDcount) of the number of consecutive ZCD cycles in a PWM signal. The ZCDcount may correspond to the load level. For example, a high ZCD count may correspond to a light load level, while a low ZCD count may correspond to a normal or heavy load level. Accordingly, the ZCD count can be used to transition to a light load 530 (i.e., light state). For example, when the ZCDcount exceeds a first threshold (i.e., thresh1) then the load condition may move from the normal/heavy load 520 (i.e., ON_MODE) to the light load 530 (i.e., LP_MODE) as the PWM transition from high-level to mid-level (H→M). The first threshold may prevent the DRMOS from changing modes until the light load condition has stabilized. For PWM transitions while the ZCDcount is less than the first thresh-old, the DRMOS remains in the ON mode (i.e., the normal/ heavy load 520).

In the light load 530, the DRMOS is configured to operate in a low-power mode (LP_MODE). In the low-power mode, some of the circuits may operate at a reduced function to save power. For example, the temperature monitor 450 (TMON), the current monitor 440 (IMON), the H/S current slope generator 430, and the ZCD circuit 420 (ZCD) are configured to operate at a reduced function to reduce power consumption. In the low-power mode (LP_MODE), the DRMOS 400 can have a quiescent power consumption that is more than the idle mode (IDLE_MODE) but less than the ON mode (ON_MODE). The power consumption of the circuit can be reduced by configuring the circuits in a low-power mode. This configuration may be triggered by a low-power mode signal (LP_MODE) and vary based on the circuit.

In a possible implementation, the temperature monitor 450 can be configured in a low-power mode by coupling a first sample-and-hold (S/H) circuit to the temperature moni-tor 450. This can be accomplished by opening a switch that shorts the first S/H circuit in another mode. For example, a signal (ON_MODE) may open the switch in the ON mode. The first S/H circuit can reduce a time that the temperature monitor 450 actively senses temperature. While the output is held at a value, the temperature monitor 450 may be powered down to reduce a power consumed.

Likewise, the current monitor 440 can be configured in a low-power mode by coupling a second sample-and-hold (S/H) circuit to the current monitor 440. This can be accomplished by opening a switch that shorts the second S/H circuit in another mode (e.g., ON_MODE). The second S/H circuit can reduce a time that the current monitor 440 actively senses temperature. While the output is held at a value, the current monitor 440 may be powered down to reduce a power consumed. The H/S current slope generator 430 may be powered down to reduce a power consumed whenever the current monitor is powered down.

In a possible implementation, the ZCD circuit 420 can be configured in a low-power mode by reducing its resolution. For example, the ZCD circuit 420 may be configured to detect the zero crossing of the sensed L/S current by measuring its level. This level measurement may require a circuit complexity corresponding to its resolution. Power consumption may decrease as accuracy is reduced and in the light load 530, high accuracy may not be required. Accordingly, in a low-power mode, some level measurement circuitry in the ZCD circuit 420 may be disabled to save power while reducing ZCD accuracy.

In a possible implementation the high-side driver 417 and the low-side driver 418 may be configured in a low-power mode. For example, in the low-power mode, the circuitry of the drivers may be configured so that the states (e.g., OFF states) of the H/S FET and the L/S FET are held OFF by a first resistor 415 and second resistor 416 coupled to the gates of the transistors.

In some PWM cycles (e.g., CCM) the inductor current ($I_L$) never reaches zero and there is no ZCD point. A PWM cycle 301 that does not include ZCD point 315 can be referred to as a NO_ZCD cycle. The DRMOS 400 further includes a NO_ZCD counter 490 configured to generate a running total (i.e., NO_ZCDcount) of the number of consecutive NO_ZCD cycles. The NO_ZCDcount may correspond to the load level. For example, a high NO_ZCD count may correspond to a normal/heavy load level, while a low NO_ZCD count may correspond to a light load level. Accordingly, the NO_ZCDcount can be used to transition from the light load 530 back to the normal/heavy load 520. In other words, the NO_ZCDcount can be used to configure the DRMOS in the ON mode. For example, when the NO_ZCDcount exceeds a second threshold (i.e., thresh2) then the load condition may move to the normal/heavy load 520 (i.e., ON_MODE) from the light load 530 (i.e., LP_MODE) as the PWM transition from mid-level to high-level (M→H). The second threshold may prevent the DRMOS from changing modes until the normal/heavy load condition has stabilized. The first threshold and the second threshold provide a hysteresis to the transition between the normal/heavy load and the light load After a PWM signal transitions from H to M (H→M) during a PWM cycle, the PWM signal may remain at M well after the ZCD point 315. The period after the ZCD point 315 that the PWM signal remains at M (i.e., the third portion 320) corresponds to the load level. For example, longer periods after the ZCD point correspond to lighter loads. A period corresponding to an ultra-light load may be predetermined and used to transition the DRMOS to the ultra-light load 510.

The DRMOS includes mid-timer 470 can be configured to begin timing (e.g., countdown) at a ZCD point 315 until a timeout period (i.e., timeout) has elapsed. When the timeout period has elapsed (e.g., when the timer expires), the mid-timer may transmit a timeout signal indicating the PWM signal has remained at M for a period longer than the timeout period. Accordingly, the timeout signal can be used to transition the DRMOS to an ultra-light load 510. For example, when the PWM signal is at M for a period after the ZCD point that is at or longer than the timeout period (i.e., timeout), then the DRMOS may move from the low-power mode (i.e., light load 530) to the idle-mode (i.e., ultra-light load 510). Likewise, when the PWM signal is at M for a period after the ZCD point that is at or longer than the timeout period (i.e., timeout), then the DRMOS may move from the ON mode (i.e., normal/heavy load 520) to the idle mode (i.e., ultra-light state).

The NO_ZCD counter 490, the ZCD counter 480, the mid-timer 470 and the logic 495 may be thought of as parts of a state machine 499 that operates according to the state machine shown in FIG. 5. In other words, the state machine 499 can be configured into one of three possible load conditions (i.e., normal/heavy, light, ultra-light) based on inputs from the PWM level detector 460 and the ZCD circuit

420. Each load condition corresponds to one of three possible modes (i.e., ON, low power, idle) of the DRMOS. Accordingly, the state machine may output a signal (or signals) to configure the DRMOS according to an operating mode (i.e., ON, low power, idle) corresponding to the state. The determination of the load condition is made locally at the DRMOS and does not require communication with the Vcore controller. The determination of load condition may be made during each cycle and the load condition may even change mid cycle. Accordingly, the efficiency of the DRMOS may be improved by using multiple operating modes to enable the circuitry of the DRMOS only to the extent necessary to meet the requirements of a load (i.e., the load condition) and can quickly react to changing load conditions.

Figure 6:
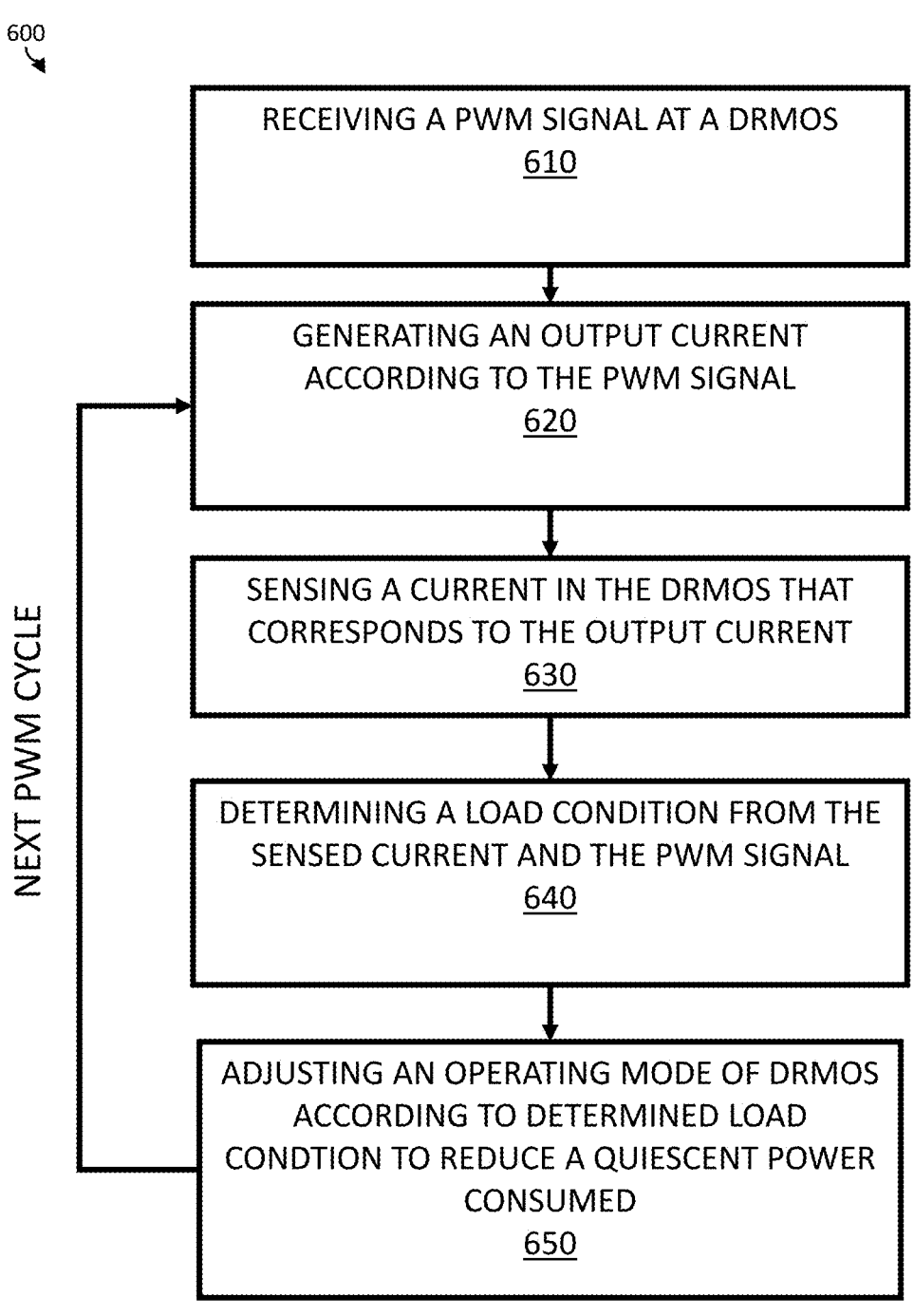
FIG. 6 is a flowchart of a method for reducing a quiescent power consumed by a phase (DMOS) of a core supply.

FIG. 6 illustrates a flowchart of a method for reducing a quiescent power consumed by an active (i.e., enabled) DRMOS in a core supply 105. The method 600 includes receiving 610 a PWM signal at the DRMOS. The DRMOS is configured by the PWM signal to generate 620 an output current ($I_L$) according to the PWM signal. The generation consumes a quiescent power. The method 600 further includes sensing 630 a current ($I_{L/S}$) at the DRMOS that corresponds to the output current. A load condition is then determined 640 from the sensed current and the PWM signal. The method 600 further includes adjusting 650 an operating mode of the DRMOS according to the determined load condition to reduce the quiescent power consumed.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SIC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A phase of a core supply, comprising:
a zero-current detector (ZCD) circuit configured to detect a ZCD point when an output current of the phase reaches zero before an end of a pulse width modulation (PWM) cycle of a PWM signal, an idle period being between the ZCD point and the end of the PWM cycle;
a PWM level detector circuit configured to determine a level of the PWM signal during the PWM cycle after the ZCD point; and
a logic circuit configured in an ultra-light load condition during the PWM cycle when the PWM signal is at the level for the idle period and the idle period is longer than a timeout period, the ultra-light load condition of the logic circuit configuring the phase of the core supply to operate in an idle mode.

2. The phase according to claim 1, wherein the logic circuit configures some circuits of the phase as non-functioning circuits to reduce a quiescent power consumed by the phase during the idle period.

3. The phase according to claim 2, wherein the non-functioning circuits include:
a temperature monitor configured to monitor a temperature of the phase.

4. The phase according to claim 2, wherein the non-functioning circuits include:
a current monitor configured to generate a monitored current (IMON) based on the output current of the phase.

5. The phase according to claim 2, wherein the non-functioning circuits include the ZCD circuit.

6. The phase according to claim 2, wherein the logic circuit configures the PWM level detector circuit of the phase to remain fully functional during the idle period, the PWM level detector circuit triggering the logic circuit to restore function to the non-functioning circuits after the idle period.

7. The phase according to claim 1, wherein a subsequent PWM cycle begins after the end of the PWM cycle, and during the subsequent PWM cycle:
the level of the PWM signal is made high to increase the output current; and
the logic circuit is configured in a normal or heavy load condition based on the level of the PWM signal being high, the normal or heavy load condition of the logic circuit configuring the phase to operate in an ON mode in which all circuits of the phase are made fully functional.

8. The phase according to claim 1, wherein during the idle period a ZCD counter circuit of the phase increases a ZCD count by 1 based on the ZCD point detected during the PWM cycle, the ZCD count corresponding to a number of consecutive PWM cycles in which the output current reaches zero before the end of the PWM cycle.

9. The phase according to claim 8, wherein:
the logic circuit is configured in a light load condition when the ZCD count exceeds a threshold, the light load condition of the logic circuit configuring the phase of the core supply to operate in a low-power mode; and
while configured in the low-power mode, circuits of the phase are functional, but less than fully functional, to reduce a quiescent power consumed by the phase.

10. A phase of a core supply, comprising:
a zero-current detector (ZCD) circuit configured to detect a ZCD point when an output current of the phase reaches zero before an end of a pulse width modulation (PWM) cycle of a PWM signal;
a PWM level detector circuit configured to determine a level of the PWM signal during the PWM cycle, the PWM signal being at a low-level, a mid-level, or a high-level; and
a logic circuit configured to:
iterate a ZCD count based on the ZCD point detected during the PWM cycle;
determine a load condition based on the level of the PWM signal and the ZCD count; and
configure the phase of the core supply to operate in a mode corresponding to the load condition and the level of the PWM signal.

11. The phase according to claim 10, wherein:
the ZCD count is a number of consecutive PWM cycles in which the output current reaches zero before the end of the PWM cycle.

12. The phase according to claim 10, wherein a normal or heavy load condition is determined when the PWM signal is at the high-level and the ZCD count is less than a threshold.

13. The phase according to claim 12, wherein while in the normal or heavy load condition, the phase of the core supply is configured to operate in an ON mode in which all circuits of the phase are made fully functional.

14. The phase according to claim 10, wherein a light load condition is determined when the PWM signal is a at the mid-level and the ZCD count is greater than or equal to a threshold.

15. The phase according to claim 14, wherein while in the light load condition, the phase of the core supply is configured to operate in a low-power mode in which circuits of the phase operate at less than full function to reduce a quiescent power consumed by the phase.

16. The phase according to claim 10, wherein:

the ZCD point is at a beginning of an idle period of the PWM cycle during which the output current of the phase is zero, the idle period ending at the end of the PWM cycle; and an ultra-light load condition is determined when the idle period is longer than a timeout period.

17. The phase according to claim 16, wherein while in the ultra-light load condition, the phase of the core supply is triggered to operate in an idle mode in which circuits of the phase are non-functional to reduce a quiescent power consumed by the phase.

18. The phase according to claim 10, wherein:

the phase is one of a plurality of phases controlled by a controller, and each phase of the plurality of phases includes a respective logic circuit configured to adjust the mode of operation of each phase without communication with the controller.

* * * * *